US012607887B2

(12) United States Patent
Cheung et al.

(10) Patent No.: US 12,607,887 B2
(45) Date of Patent: Apr. 21, 2026

(54) HETEROGENEOUS III-V/Si (DE-)INTERLEAVER FILTERS WITH NON-VOLATILE MEMRISTIVE FUNCTIONALITY

(71) Applicant: HEWLETT PACKARD ENTERPRISE DEVELOPMENT LP, Spring, TX (US)

(72) Inventors: Stanley Cheung, Milpitas, CA (US); Bassem Tossoun, Santa Barbara, CA (US); Yuan Yuan, Milpitas, CA (US); Yiwei Peng, Spring, TX (US); Geza Kurczveil, Santa Barbara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 427 days.

(21) Appl. No.: 18/382,657

(22) Filed: Oct. 23, 2023

(65) Prior Publication Data

US 2025/0130446 A1      Apr. 24, 2025

(51) Int. Cl.
*G02F 1/015*          (2006.01)
*G02F 1/21*           (2006.01)
*G02F 1/225*          (2006.01)

(52) U.S. Cl.
CPC ............ *G02F 1/0155* (2021.01); *G02F 1/212* (2021.01); *G02F 1/2257* (2013.01); *G02F 2203/50* (2013.01)

(58) Field of Classification Search
CPC ...... G02F 1/212; G02F 1/2257; G02F 1/0155; G02F 2203/50
See application file for complete search history.

(56) References Cited

U.S. PATENT DOCUMENTS

| | | | | |
|---|---|---|---|---|
| 7,805,026 B2 * | 9/2010 | Gill | ........................ | G02F 1/225 |
| | | | | 359/279 |
| 8,111,722 B1 * | 2/2012 | Maleki | .................... | G02F 1/353 |
| | | | | 372/18 |
| 8,741,684 B2 * | 6/2014 | Bogaerts | ............ | G02B 6/12004 |
| | | | | 438/69 |
| 8,923,700 B2 * | 12/2014 | Socci | .................. | H04J 14/0206 |
| | | | | 398/85 |

(Continued)

OTHER PUBLICATIONS

Cheung et al., "Heterogeneous III-V/Si Non-Volatile Optical Memory: A Mach-Zehnder Memristor", Conference on Lasers and Electro-Optics (CLEO)., 2022, 2 pages.

(Continued)

*Primary Examiner* — Andrew Jordan
(74) *Attorney, Agent, or Firm* — Sheppard Mullin Richter & Hampton LLP

(57)          ABSTRACT

Systems and methods are provided for optical devices with integrated memristor behavior adapted for non-volatile retention of phase tuning. Examples include an optical filter having a first waveguide formed on a substrate and a phase shift mechanism coupled to the first waveguide. The phase shift mechanism comprises a semiconductor material layer bonded the first waveguide, and a filamentation layer formed between the first waveguide and the semiconductor material based on applying an electric field to the phase shift mechanism. The filamentation layer causes a non-volatile change in a refractive index of the first waveguide, that provides for phase detuning.

20 Claims, 8 Drawing Sheets

(56) References Cited

U.S. PATENT DOCUMENTS

| | | | | |
|---|---|---|---|---|
| 10,657,440 | B2 * | 5/2020 | Abel | G06N 3/0675 |
| 11,187,963 | B2 * | 11/2021 | Huang | G02F 1/3517 |
| 11,355,899 | B2 * | 6/2022 | Tossoun | H01S 5/0225 |
| 11,422,027 | B1 * | 8/2022 | Yuan | B60L 53/80 |
| 11,733,455 | B2 * | 8/2023 | Liang | G02F 1/035 |
| | | | | 385/3 |
| 12,298,649 | B2 * | 5/2025 | Yuan | G02F 1/212 |
| 12,326,644 | B2 * | 6/2025 | Peng | G06N 3/048 |
| 12,332,539 | B2 * | 6/2025 | Yuan | G02F 1/3556 |
| 2004/0208421 | A1 * | 10/2004 | Kitagawa | G02F 1/3136 |
| | | | | 385/16 |
| 2012/0288971 | A1 * | 11/2012 | Bogaerts | G02B 6/12004 |
| | | | | 438/57 |
| 2017/0116514 | A1 * | 4/2017 | Abel | G06N 3/0675 |
| 2019/0065941 | A1 * | 2/2019 | Yoo | G06N 3/063 |
| 2021/0072784 | A1 * | 3/2021 | Lin | G06N 3/067 |
| 2021/0116781 | A1 * | 4/2021 | Hughes | H03K 3/42 |
| 2021/0278743 | A1 * | 9/2021 | Huang | G02F 1/225 |
| 2021/0391694 | A1 * | 12/2021 | Hayashi | H01S 5/50 |
| 2022/0069541 | A1 * | 3/2022 | Tossoun | H01S 5/0261 |
| 2022/0260416 | A1 * | 8/2022 | Yuan | B60L 53/80 |
| 2024/0004259 | A1 * | 1/2024 | Tossoun | G02F 1/025 |
| 2024/0118582 | A1 * | 4/2024 | Peng | G02F 1/365 |
| 2024/0134247 | A1 * | 4/2024 | Yuan | H01S 5/04257 |
| 2024/0184182 | A1 * | 6/2024 | Cheung | G02F 1/2257 |
| 2024/0231180 | A9 * | 7/2024 | Yuan | H01S 5/04257 |
| 2024/0311627 | A1 * | 9/2024 | Tossoun | G06N 3/048 |
| 2025/0035850 | A1 * | 1/2025 | Peng | G02B 6/29338 |
| 2025/0130446 | A1 * | 4/2025 | Cheung | G02F 1/0155 |
| 2025/0139426 | A1 * | 5/2025 | Cheung | G06F 17/14 |
| 2025/0271725 | A1 * | 8/2025 | Tossoun | G02F 1/2257 |

OTHER PUBLICATIONS

Strukov et al., "The missing memristor found", Nature, vol. 453, 2008, 4 pages.
Tossoun et al., "Memristor Photonics", paper Tu5B.3, 2021, 2 pages.

* cited by examiner

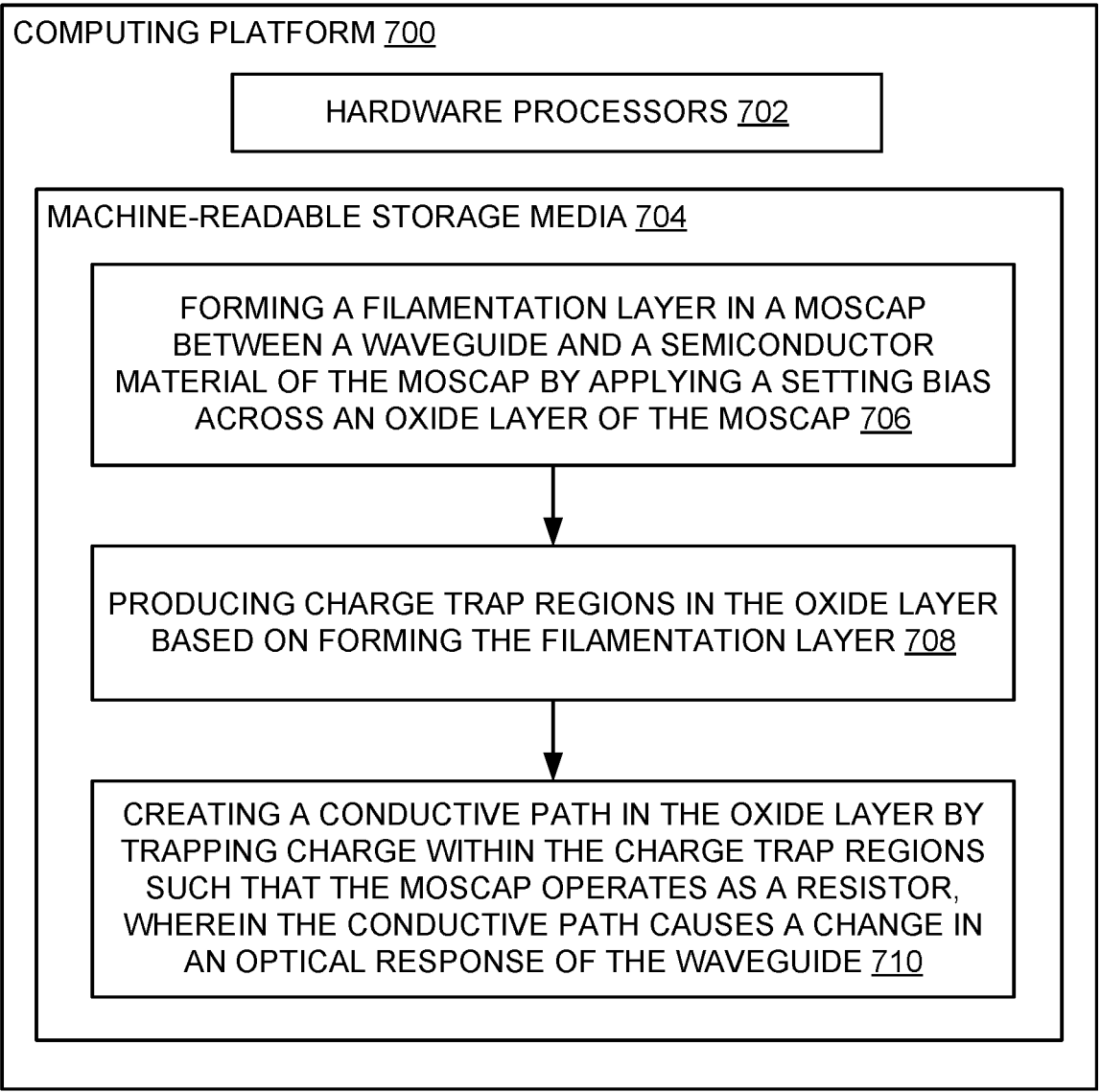

COMPUTING PLATFORM 700

HARDWARE PROCESSORS 702

MACHINE-READABLE STORAGE MEDIA 704

FORMING A FILAMENTATION LAYER IN A MOSCAP BETWEEN A WAVEGUIDE AND A SEMICONDUCTOR MATERIAL OF THE MOSCAP BY APPLYING A SETTING BIAS ACROSS AN OXIDE LAYER OF THE MOSCAP 706

PRODUCING CHARGE TRAP REGIONS IN THE OXIDE LAYER BASED ON FORMING THE FILAMENTATION LAYER 708

CREATING A CONDUCTIVE PATH IN THE OXIDE LAYER BY TRAPPING CHARGE WITHIN THE CHARGE TRAP REGIONS SUCH THAT THE MOSCAP OPERATES AS A RESISTOR, WHEREIN THE CONDUCTIVE PATH CAUSES A CHANGE IN AN OPTICAL RESPONSE OF THE WAVEGUIDE 710

FIG. 7

HETEROGENEOUS III-V/Si (DE-) INTERLEAVER FILTERS WITH NON-VOLATILE MEMRISTIVE FUNCTIONALITY

STATEMENT OF GOVERNMENT INTEREST

This invention was made with Government support under Agreement Number H98230-18-3-0001. The Government has certain rights in the invention.

BACKGROUND

An optical interleaver (also referred to as a photonic interleaver) is a device used to combine two sets of dense wavelength-division multiplexing (DWDM) channels into a signal stream, in an interleaving sequence. An optical interleaver can be used in a reverse direction, forming an optical deinterleaver that separates a denser signal into separate channels. As such, these devices can be referred to as (de-) interleavers. Optical (de-) interleavers can be based on optical interference.

BRIEF DESCRIPTION OF THE DRAWINGS

The present disclosure, in accordance with one or more various embodiments, is described in detail with reference to the following figures. The figures are provided for purposes of illustration only and merely depict typical, or example embodiments.

FIG. 7 is an example computing component that may be used to implement various features of optical filtering in accordance with the implementations disclosed herein.

Figure 1:
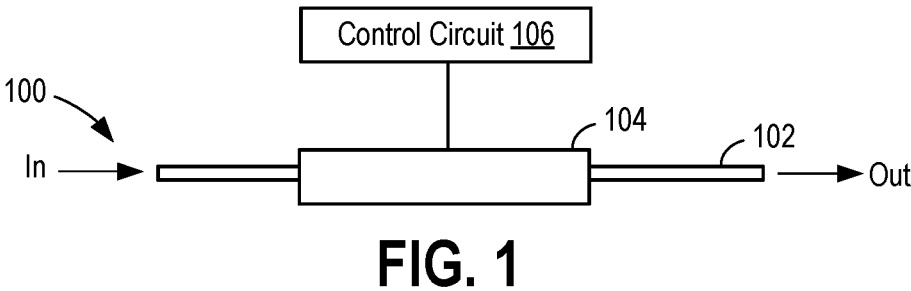
FIG. 1 depicts a schematic diagram of an example optical modulation device in accordance with implementations disclosed herein.

The figures are not exhaustive and do not limit the present disclosure to the precise form disclosed.

DETAILED DESCRIPTION

The present disclosure provides for photonic (de-) interleavers and optical filters that leverage an integrated memristor adapted for non-volatile retention of phase tuning. As used herein, "non-volatile" refers to an ability to retain a state even in the absence of supplied power. In the case of examples disclosed herein, photonic (de-) interleavers can be provided that can retrain a phase tuning state without requiring power to be supplied to the device. The non-volatile phase tuning can be utilized to realize optical interference that provides for the filtering functionality of devices disclosed herein. Through the non-volatile retention of the phase tuning, the devices disclosed herein can be implemented in large scale photonic systems and optical neural networks (ONNs), with reduced power consumption as the (de-) interleavers can be operated with minimal or negligible power usage.

Recently, processor performance has scaled accordingly to Moore's Law (e.g., the number of transistors in an integrated circuit (IC) doubles about every two years). However, there remains a limit in current computer architectures due to what is known as the von-Neumann bottleneck. The von-Neumann bottleneck places a limit on the amount of data that can be transferred from a memory to a processor.

Memristors offer a potential solution towards non-volatile in-memory computing that can surpass the limitations of von-Neumann bottlenecked designs. Additionally, silicon (Si) based photonics have shown promise for optical interconnect solutions with an aim to increase aggregate data bandwidth, for example, to multiple terabytes (Tb)-per-second, while also reducing system-level power consumption to a few or sub-pico Joules-per-bit. The co-integration of silicon photonics and non-volatile memory may provide a path towards overcoming the limitations of the von-Neumann bottleneck.

The technology according to the present disclosure integrates memristors with optical filters, such as (de-) interleavers, which can play a role in energy efficient, non-volatile large scale integrated photonics, neuromorphic ONNs, and optical computing architectures. In an example implementation, optical filtering devices, such as photonic (de-) interleavers, are provided. An optical filtering device according to the present disclosure may comprise as a resonator structure assisted asymmetric Mach-Zehnder Interferometer (MZI), having a resonator assisted arm and a non-resonator assisted arm. The resonator assisted arm may comprise a resonator structure having a phase shift mechanism coupled thereto. The non-resonator assisted arm also comprises a phase shift mechanism. In an example implementation, the resonator structure can be provided as a micro-ring resonator, and the resonator structure assisted asymmetric MZI as a ring resonator assisted asymmetric MZI (1-RAMZI).

The phase shift mechanisms can be provided as metal-oxide-semiconductor (MOS) capacitors. A MOS capacitor (MOSCAP), according to various implementations of the present disclosure, is a heterogenous Group III-V/Si MOSCAP structure defined by an oxide layer, a waveguide on the oxide layer, and a Group III-V layer bonded to the waveguide opposite the oxide layer. In various examples, the waveguide is a Si waveguide and the Group III-V layer is hydrophilic wafer-bonded to the Si waveguide. Before wafer-bonding, the Group III-V layer and the Si waveguide can be coated with a first material followed by a second material, and the waveguide can be coated with the second material. In an example implementation, the first material can be $Al_2O_3$ and the second material can be $HfO_2$. Other example materials that may be used as the first and/or second material include, but are not limited to, transition metal oxides (e.g., titanium dioxide, zinc oxide, nickel oxide, etc.), organic materials, chalcogenides, 2D materials (e.g., molybdenum disulfide and the like), and ferroelectric materials, among others.

According to various examples, the MOSCAP structure can be configured to operate as a memristor. For example, applying an electric field (e.g., a setting voltage bias having a first polarity) across the oxide layer can form a filamentation layer that acts as a dielectric of the MOSCAP. Charge trap regions are formed in the oxide layer that creates a conductive path within the oxide layer, which permits a flow of electrons. The conductive path causes the MOSCAP to switch from a capacitor to a resistor (referred to herein as a MOS resistor) by effectively changing the resistance of the material, thereby exhibiting conductive behavior. The conductive path and charge trap regions can remain in the oxide layer after the voltage bias is removed, thereby providing non-volatile retention. The conductive path causes the effective index of refraction of the waveguide to change, which can be used to adjust the phase of the phase shift mechanism and tune the resonance of the resonator structure. Since the conductive path remains when voltage bias is not applied to the MOSCAP, tuning of the phase shift mechanism can be achieved through non-volatile memristive behavior and maintained without having power supplied to the MOSCAP and thus not consuming additional power then needed to set the memristive behavior. This tuning can enable optical filtering devices disclosed herein to operate as a passband filter.

According to examples of the present disclosure, setting of the resonance can be reversed (e.g., reset) by applying an electric field of a second polarity. The applied electric field may be referred to herein as a "reset voltage bias" that has a reverse polarity, relative to the first polarity. This reset voltage bias can operate to rupture the conductive paths in the oxide layer by dissipating (e.g., destroying) the charge trap regions and permitting charge to relocate within the device. This effectively restores the MOSCAP to a low conductivity state, at which the MOSCAP acts as a capacitor.

Accordingly, the implementations disclosed herein provide several non-limiting advantages over conventional optical filters. For example, the non-volatile phase tuning provides for minimal (e.g. near zero) power consumption by the optical filters. By reapplying a setting voltage and then removing the voltage bias once set, post-fabrication errors can be corrected with zero power consumption beyond that necessitated by the setting voltage. Through the minimal power consumption, the implementations disclosed herein find suitability for a number of applications, for example but not limited to, photonic accelerators, neuromorphic computing, data communications, telecommunications, radio-frequency photonics, and any other system that requires energy efficient filtering. Furthermore, the optical filters disclosed herein can be realized as a heterogeneous Group III-V/Si structure, which can be integrated into existing heterogeneous Group III-V/Si platforms through known bonding techniques. For example, the presently disclosed examples can be integrated with lasers, modulators, phase shifters, photodetectors, etc. for a complete end to end solution.

FIG. 1 depicts a schematic diagram of an optical modulation device 100 in accordance with implementations disclosed herein. Optical modulation device 100 is provided as a waveguide 102 and a tuning mechanism 104 disposed along the waveguide 102 configured to change a phase of an optical signal propagating along the waveguide. Optical modulation device 100 may be formed in a silicon-based photonic chip of a silicon-on-insulator (SOI) platform, for example, waveguide 102 may be formed from silicon.

According to various examples, the tuning mechanism 104 can be configured to tune the effective index of refraction of the waveguide 102. The tuning mechanism 104 may be implemented through thermal-optical tuning (e.g., a resistor coupled to the waveguide that generates heat based on an applied voltage), electro-optical tuning (e.g., coupling a PN diode to the waveguide), metal-oxide-semiconductor capacitor (MOSCAP) tuning, or the like. An example implementation of tuning mechanism 104 implemented as a MOSCAP is provided below in connection with FIGS. 2A-2C. The tuning mechanism 104 can be controlled, as described below, to adjust the effective refractive index of the waveguide 102, thereby tuning the phase of the optical signal propagating on waveguide 102.

The tuning mechanism 104 can be configured to operate as a memristor. For example, applying an electric field (e.g., a setting voltage bias having a first polarity) can form a filamentation layer in the tuning mechanism 104 that generates charge trap regions to create a conductive path within the tuning mechanism 104. The tuning mechanism 104 may be considered to be in an "on" state at this point. The conductive path exhibits conductive behavior within the tuning mechanism 104. The conductive path and charge trap regions remain even after the voltage bias is removed, thereby providing non-volatile retention.

The conductive path formed in the tuning mechanism 104 causes the effective refractive index of the waveguide 102 to change. Thus, selective control of the voltage bias applied to tuning mechanism 104 through a control circuit 106 can be used to form a desired conductive path, which tunes the effective refractive index of waveguide 102 and sets an adjustment of the phase of an optical signal on waveguide 102 induced by the changed effective refractive index. Since the conductive path remains when voltage bias is not applied to the tuning mechanism 104, tuning of the tuning mechanism 104 can be achieved through non-volatile memristive behavior and maintained without a connected power source.

Resetting of the induced phase shift can be reversed by applying a voltage bias of a reverse polarity relative to the voltage bias used to form the conduct paths. The reverse voltage bias can rupture the conductive paths by dissipating the charge trap regions and permitting a charge to relocate within the tuning mechanism 104. This effectively restores the tuning mechanism 104 to the "off" state.

Figure 2A:
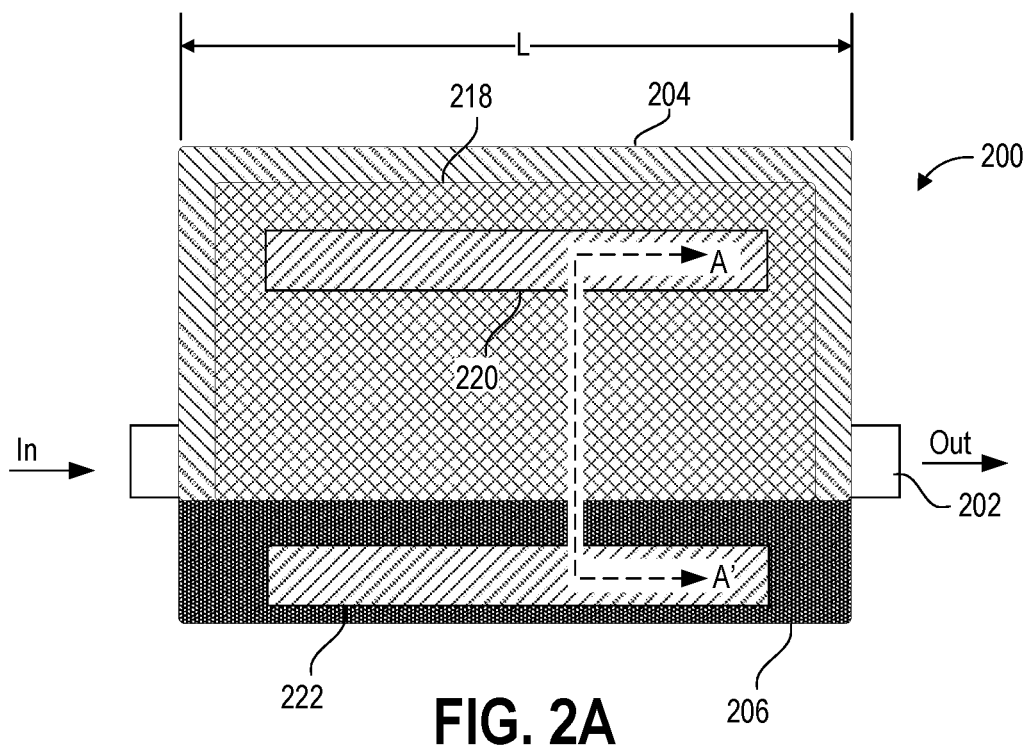
FIGS. 2A-2C depict schematic diagrams of another example optical modulation device, in accordance with an implementation disclosed herein.
Figure 2B:
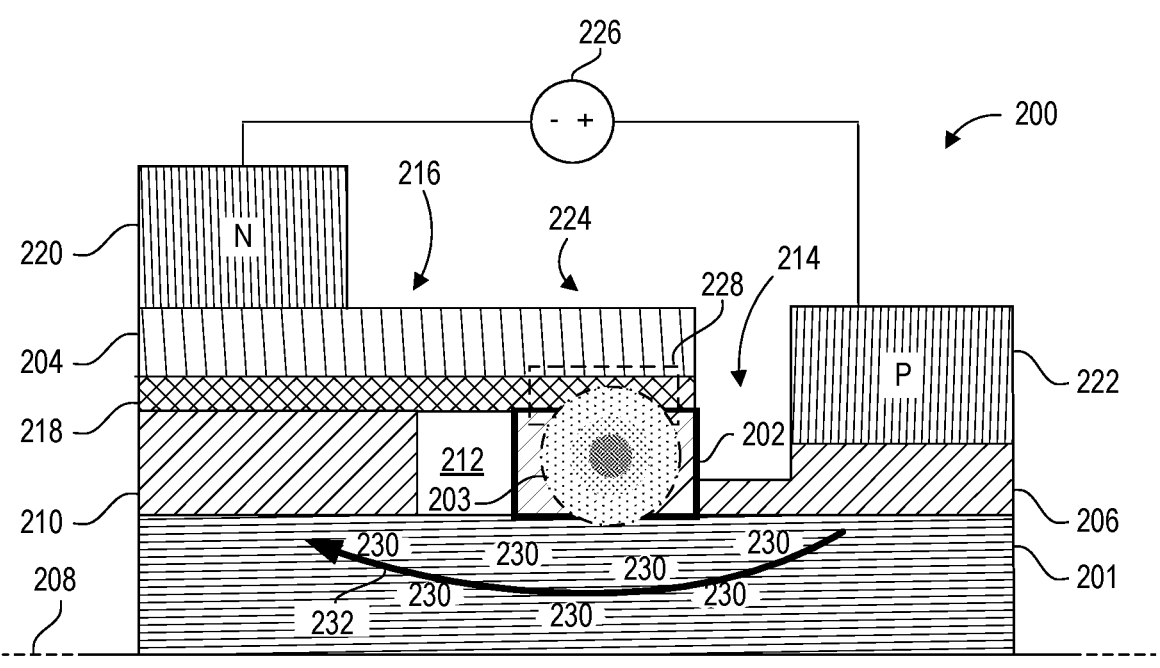
Figure 2C:
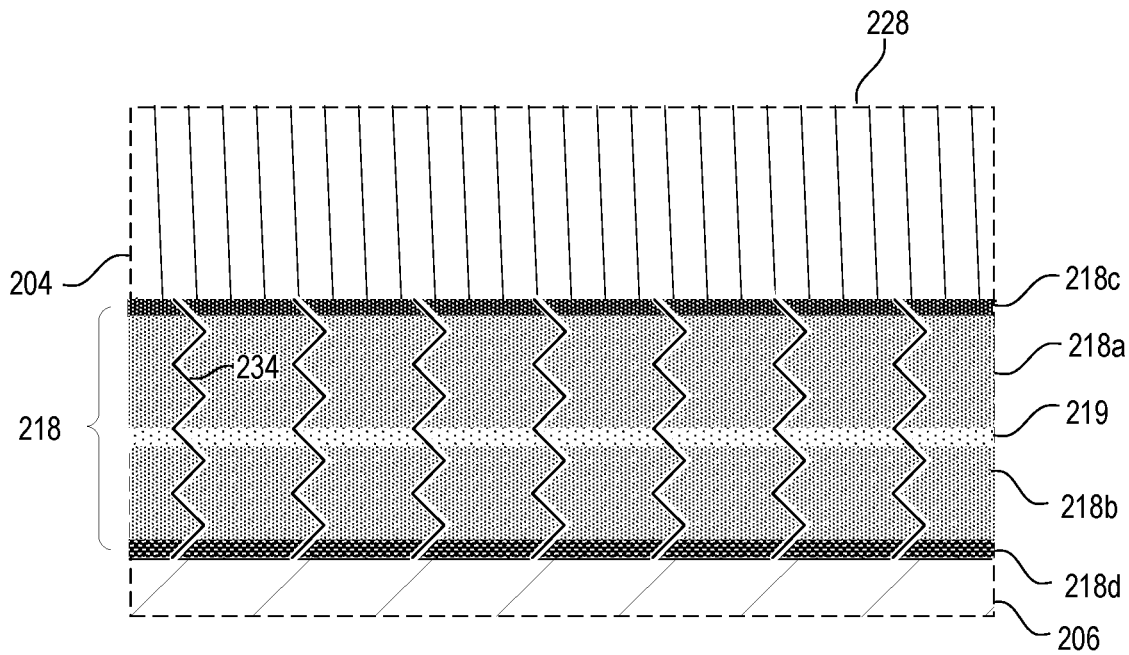

FIGS. 2A-2C depict schematic diagrams of another example optical modulation device 200 in accordance with an implementation disclosed herein. Optical modulation device 200 may be an example of optical modulation device 100 described above, where tuning mechanism 104 is implemented as an example hybrid metal-oxide-semiconductor (MOS) device. Optical modulation device 200 can be referred to as a hybrid MOS optical modulator that may be implemented as a phase tuning mechanism. FIG. 2A is a top-down view of the optical modulation device 200 and FIG. 2B is a section view of the optical modulation device 200 taken along a line I-I' shown in FIG. 2A. FIG. 2C depicts a zoomed in view of region 228 shown in FIG. 2B.

The optical modulation device 200 includes a waveguide 202, a cathode 204 comprising a first material and formed in the waveguide 202, and an anode 206 comprising a second material that is different from the first material and formed in the waveguide 202. The anode 206 adjoins the cathode 204. A capacitor (also referred to as a capacitive structure) is defined between the anode 206 and the cathode 204.

In some examples, a buried oxide (BOX) layer 201 is grown on an underlying substrate 208, which may be provided as silicon. In an example, BOX layer 201 may comprise silicon dioxide ($SiO_2$). Other examples of materials for substrate 208 may include, but are not limited to, Silicon Nitride ($Si_3N_4$), Aluminum oxide ($Al_2O_3$), Hafnium Dioxide ($HfO_2$), diamond, silicon carbide (SIC), or combinations thereof. A silicon layer 210 is formed on the substrate 208. A trench 212 separates the optical modulation device 200 into two portions 214 and 216. The first portion 214 comprises the anode 206. The waveguide 202 is formed in the anode 206. The second portion 216 comprises the cathode 204, which extends over the trench 212 to the first portion 214. In various embodiments, the cathode 204 comprises a layer of Group III-V material as the first material. A MOSCAP 224 (also referred to as a MOSCAP or MOSCAP structure) is defined between the cathode 204 and the anode 206.

A dielectric 218 is formed between the cathode 204 and the anode 206. The dielectric 218 may be an electrically insulating material formed between the cathode 204 and anode 206 of the MOSCAP 224, and the polarization of the dielectric 218 by an applied electric field may increase the surface charge of the MOSCAP 224 for a given electric field strength. The dielectric 218 can be native oxides of the cathode or the anode or both, or can be external dielectric materials such as high-k dielectrics or polymers which can be formed by deposition, oxidation, wafer bonding or other dielectric coating methods. In other examples, dielectric 218 may be formed from $SiO_2$, $Si_3N_4$, $Al_2O_3$, polyimides, transition metal oxides (e.g., $HfO_2$, titanium dioxide, zinc oxide, nickel oxide, etc.), organic materials, chalcogenides, 2D materials (e.g., molybdenum disulfide and the like), and ferroelectric materials, among others.

The cathode 204 may comprise negatively doped Group III-V material (such as indium phosphide (InP), germanium (Ge), gallium arsenide (GaAs), aluminum gallium arsenide (AlGaAs), indium gallium arsenide (InGaAs), indium arsenide (InAs), or combinations thereof) and the anode 206 may comprise positively doped silicon or other Group IV material. In an illustrative example, cathode 204 comprises GaAs. In other examples, cathode 204 may be provided as Indium tin oxide (ITO), amorphous silicon, polycrystalline silicon, and fluorine dope tine oxide (FTO). Other materials are possible as long as the material provides for conductivity and relatively low optical loss.

A cathode electrode 220 may be disposed on the cathode 204 and an anode electrode 222 can be disposed on the anode 206. When a voltage is applied, for example, by power source 226, between the electrodes, carrier accumulation, depletion or inversion can occur around dielectric 218. Due to the capacitor region overlapping with the waveguide, carrier concentration change may lead to changes in refractive index and propagation loss within waveguide 202. By biasing the voltage applied between the electrodes, the refractive index may be changed accordingly, thereby inducing a phase shift modulation. Thus, an optical signal 203 (shown as a gradient illustrative of the optical power) propagating through waveguide 202 can be phase shifted based on changes in the refractive index induced by applying a voltage biasing to the MOSCAP 224. The phase shifted optical signal 203 continues along the waveguide 202.

For example, FIG. 2A includes a power source 226, which can be controlled by, for example, control circuit 106 of FIG. 1. The power source 226 acts as a signal source and has a negative terminal connected to the cathode electrode 220 and a positive terminal connected the anode electrode 222. This results in a migration of negative charges from the cathode 204 toward a side of the waveguide 202 adjacent to the cathode 204, and migration of positive charges ("holes") from the anode 206 to an opposite side of the waveguide 202 (also referred to herein as accumulation mode). In other examples the polarity of the power source 226 may be reversed. Reversing the polarity of the power source 226 causes a migration of negative charges from the waveguide 202 toward cathode electrode 220, and migration of holes from the waveguide 202 toward anode electrode 222 (also referred to herein as depletion mode).

The dielectric 218 forms at the boundary between the Group III-V material of the cathode 204 and the underlying capacitor portion of the intrinsic silicon or other Group IV material. A thin layer (e.g., on the order of tens of nanometers or less) of silicon and the Group III-V oxides is provided between the cathode 204 and anode 206, from which dielectric 218 forms naturally at this boundary and serves as a dielectric for the capacitor. In some examples, this thin layer has a thickness on a nanoscale, for example, a few nanometers thick. In some examples, steps need not be taken to encourage the formation of dielectric 218. In other examples, the formation of dielectric 218 may be stimulated, for example by elevating the temperature, exposing the materials to an oxygen-rich atmosphere, or other suitable technique. Materials that can be used to form the dielectric 218 may include, but not limited to, $SiO_2$, $Si_3N_4$, $Al_2O_3$, $HfO_2$, polyimide, benzocyclobutene (BCB), polyimides, transition metal oxides (e.g., titanium dioxide, zinc oxide, nickel oxide, etc.), organic materials, chalcogenides, 2D materials (e.g., molybdenum disulfide and the like), and ferroelectric materials, and combinations thereof.

The MOSCAP 224 can operate in accumulation, depletion or inversion mode (e.g., accumulation of electrons at the dielectric in addition to presence of holes). As discussed above, a voltage bias can be applied between an anode and cathode, causing a thin charge layer to accumulate, deplete, or invert on both sides of the dielectric 218. The resulting change in free carrier density causes a change in refractive index (n) of the waveguide 202, which is manifested as a change in the effective refractive index ($\Delta n_{eff}$). The amount of change or modulation in the effective refractive index ($\Delta n_{eff}$) and associated change in optical losses ($\Delta\alpha$) can be described as follows:

$$\Delta n_{eff} = \frac{-q^2\lambda_0^2}{8\pi^2c^2n\varepsilon_0}\left(\frac{\Delta N_e}{m_{ce}^*} + \frac{\Delta N_h}{m_{ch}^*}\right) \qquad \text{Eq. 1}$$

$$\Delta\alpha = \frac{-q^3\lambda_0^2}{4\pi^2c^3n\varepsilon_0}\left(\frac{\Delta N_e}{m_{ce}^{*2}\mu_e} + \frac{\Delta N_h}{m_{ch}^{*2}\mu_h}\right) \qquad \text{Eq. 2}$$

Where q is electrical charge applied to the cathode 204 and the anode 206; c is the speed of light in vacuum; so is the permittivity of free space; n is the material refractive index; $\Delta N$ represents a change in carrier density, such that $\Delta N_e$ represents the change in carrier density in terms of electrons and $\Delta N_h$ represents the change in carrier density in terms of holes; m* represents the relative effective mass of electrons ($m^*_{ce}$) and holes ($m^*_{ch}$); $\mu_h$ represents the hole mobility; He represents the electron mobility; and $\lambda_0$ is the free space wavelength.

An optical phase shift ($\Delta\varphi$) at the end of the capacitor depends on the magnitude of the voltage-induced $\Delta$neff, the device length L, and the optical wavelength $\lambda$. In this example, the optical phase shift can be calculated as $\Delta\varphi=2\pi\Delta n_{eff}L\Delta$. Thus, the optical phase of the light within waveguide 202 may be shifted based on the voltage-induced $\Delta n_{eff}$.

Additionally, electroforming or filamentation can be stimulated by applying an electric field (referred to herein as a "set electric field" or "set voltage bias") across underlying substrate 208. The magnitude of the applied electric field may be large enough to stimulate electroforming. For example, by increasing the voltage bias supplied by power source 226 to the anode electrode 222 and cathode electrode 220, electroforming can be stimulated in the underlying substrate 208 which forms filaments 234 in the dielectric 218 that extend between cathode 204 and anode 206, shown in FIG. 2C. The filaments 234 are depicted as having a shape, but this is for illustrative purposes only and not intended to illustrate the actual shape or structure of filaments 234. The specific shape and structure of the filaments 234 may be dependent on materials (and doping of the materials) forming the various layers and the voltage bias applied to the electrodes 222 and 220 that form the filaments 234.

When the filaments 234 are present, the dielectric 218 may be considered a filamentation layer. The filamentation layer provides an electrical path between cathode 204 and 206 that causes charge trap regions 230 to form in the underlying substrate 208, which creates a conductive path 232 (shown as an arrow) within the underlying BOX layer 201. In one example, the filamentation layer may create defect sites within the BOX layer 201 that function to trap charges. The charge trap regions 230 operate to hold negative charges within the conductive path 232, thereby inducing a migration of negative charges. This resulting change in free carrier density causes the change in the refractive index of waveguide 202, similar to that described above in connection with Eqs. 1 and 2. Thus, the accumulation of charges within underlying substrate 208 induces an amount of change in the effective refractive index, which can be selectively set to induce a desired phase shift according to Eq. 3.

While the conductive path 232 is schematically shown as an arrow, but the actual shape of the conductive path 232 is not intended to be limited to the depicted arrow. The conductive path 232 may be dependent on the materials (and doping levels) of the device 200, as well as the voltage bias applied across the device.

For example, the conductive path effectively changes the resistance of the underlying substrate 208, which causes the MOSCAP 224 to switch from capacitive operation to a resistive operation. This change in operation exhibits a conductive behavior provided by filaments 234 subject to a resistance provided by the dielectric layer 218. The conductive path 232 and charge trap regions 230 can remain in the underlying BOX layer 201 in the absence of a voltage bias, thereby providing non-volatile retention. The conductive path causes a further change in the effective index of refraction ($n_{eff}$) of the waveguide 102, which can be used to tune the phase shift ($\Delta\varphi$) induced by the optical modulation device 200. Since the conductive path remains when voltage bias is not applied, phase tuning of the optical modulation device 200 can be achieved through non-volatile memristive behavior and maintained in the absence of power supplied to the optical modulation device 200.

FIG. 2C depicts a zoomed in view of region 228 shown in FIG. 2B. In FIG. 2C, optical signal 203 is not shown for ease of illustration and legibility of the various layers. It will be appreciated that in actual operation, the optical signal 203 may be present in the structures depicted in FIG. 2C. As shown in FIG. 2C, a plurality of layers are provided, at the interface between the material of the anode 206 and the material of the cathode 204, from which the dielectric 218 is formed between cathode 204 and anode 206. The interface comprises a plurality of layers 218a-218d and a bonding interface 219 resulting from wafer bonding of the anode 206 to cathode 204. In various examples, the cathode 204 is hydrophilic wafer-bonded to the anode 206, such that the material of cathode 204 is bonded to the waveguide 202 resulting in bonding interface 219.

Prior to bonding, layers 218a-218d are provided that, once bonded, stimulate formation of the dielectric 218, as discussed above. For example, layer 218d can be deposited on anode 206 followed by layer 218b. Similarly, layer 218c can be deposited on cathode 204 followed by layer 218a. The materials of layers 218a-218d may include, but not limited to, $SiO_2$, $Si_3N_4$, $Al_2O_3$, $HfO_2$, polyimide, BCB, polyimides, transition metal oxides (e.g., titanium dioxide, zinc oxide, nickel oxide, etc.), organic materials, chalcogenides, 2D materials (e.g., molybdenum disulfide and the like), and ferroelectric materials, and combinations thereof. In some examples, layers 218b and 218a may be the same material, which may be different than the materials of layers 218c and 218d. In an example implementation, anode 206 may be coated with a layer of $SiO_2$ as layer 218d followed by a layer of $HfO_2$ as layer 218b, while cathode 204 may be coated with a layer of $Al_2O_2$ as layer 218c and followed by a layer of $HfO_2$ as layer 218a. Each layer may be formed via atomic layer deposition (ALD) or other fabrication techniques as known in the art.

As noted above, the dielectric 218 may be formed between the cathode 204 and the anode 206. The layers 218a-d can act to stimulate the formation of the dielectric 218. As discussed above, dielectric 218 may be a thin layer of silicon and Group III-V oxides that forms naturally at the boundary and serves as dielectric 218. In this example, the thin layer is provided as $Al_2O_3$ and $HfO_2$, at the boundary of the anode 206 (e.g., between anode 206 and layer 218b), and the dielectric 218 is formed from these layers. In some examples, steps need not be taken to encourage the formation of dielectric 218. In other examples, the formation of dielectric 218 may be stimulated, for example by elevating the temperature, exposing the materials to an oxygen-rich atmosphere, or other suitable technique.

When a high enough voltage bias is supplied across underlying substrate 208 to stimulate electroforming, filaments 234 may be formed that transition dielectric 218 to a filamentation layer. As discussed above, formation of the filamentation layer results in formation of the conductive path 232 within underlying BOX layer 201.

Furthermore, the non-volatile phase shift can be reset by applying an voltage bias (e.g., a reset voltage bias) having a reverse polarity relative to the set voltage bias. This reset voltage bias ruptures the filaments 234, thereby removing the filamentation layer. As a result, the conductive path in the underlying substrate 208 may be ruptured by dissipating the charge trap regions and permitting charge to relocate within the underlying substrate 208. This effectively restores the MOSCAP 224 to a low conductivity state, at which the MOSCAP acts as a capacitor.

Additional examples of a MOSCAPs are provided, for example, in U.S. Pat. Nos. 9,612,503; 11,355,899; and 11,442,235, the disclosures of which are incorporated herein by reference in their entirety.

Figure 3:
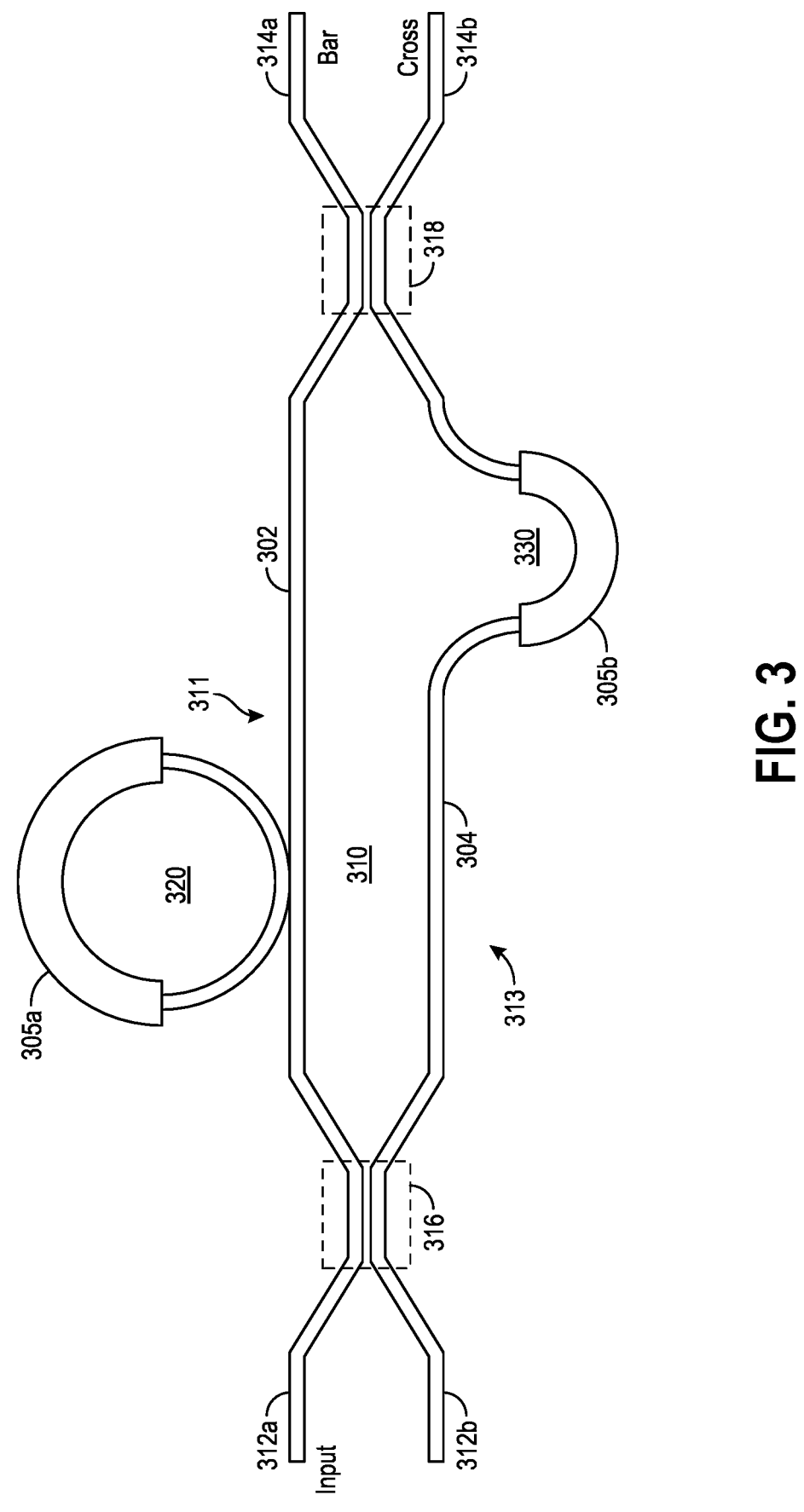
FIG. 3 depicts a schematic diagram of an optical filter device in accordance with an implementation disclosed herein.

FIG. 3 depicts a schematic diagram of an optical filter device 300 in accordance with implementations disclosed herein. The optical filter device 300 according to various examples may be implemented, for example, as a (de-) interleaver. The optical filter device 300 comprises one or more phase shift mechanism 305 (shown as phase shift mechanisms 305a and 305b), implemented as the optical modulation device 100 of FIG. 1 and/or the optical modulation device 200 of FIGS. 2A-2C, disposed on one or more waveguides, such as a waveguide 302 and/or waveguide 304.

Optical filter device 300, according to this example, is provided as a MZI 310, which can be utilized to filter an optical signal input into the optical filter device 300 according to wavelengths contained in the optical signal. MZI 310 comprises waveguides 302 and 304 that guide propagation of an optical signal input into an input port 312a and 312b, respectively. For example, MZI 310 may comprise a first arm 311 formed of a first waveguide 302 having input port 312a and second arm 313 formed of a second waveguide 304 having input port 312b.

An optical signal input into one of the waveguides can be optically coupled into the other waveguide by a coupler 316. An amount of the optical signal coupled into one waveguide from the other is based on a coupling efficiency of Coupler 316 ($c_0$). For example, in the case of optical filter device 300 implemented as a deinterleaver, a portion of an optical signal supplied to input port 312a can be coupled into waveguides 304 according to the coupling efficiency of the Coupler 316. In various examples, the coupling efficiency of Coupler 316 may be 50%, such that equal amount of the input optical remains in waveguides 302 (e.g., in arm 311) and is coupled into waveguides 304 (e.g., into arm 313). Coupler 316, according to illustrative examples, may be a directional coupler configured to evanescently couple an optical signal between adjacent waveguides.

In the example of FIG. 3, a resonator structure 320 can be optically coupled to one of the arms of MZI 310, thereby providing a resonator structure assisted asymmetric MZI. In this example, resonator structure 320 is evanescently coupled to the first arm 311, which can be referred to as a resonator assisted arm. The resonator structure 320 may be implemented as an MRR, in some examples, or other optical ring resonator. A resonator structure may be a closed loop waveguide formed of semiconductor material, such as silicon or other Group IV material. The shape of the loop may be, for example, but not limited to, circular, elliptical, a racetrack shape, etc., thereby forming a resonator structure. A resonator structure may have a resonance wavelength ($\lambda$) defined based on the round-trip length of the resonator structure ($L_{ring}$). In the case of evanescent coupling, the amount of light optically coupled into and out of the resonator structure 320 is based on a distance between the waveguides and the resonance frequency of the resonator structure 320. The amount of light optically coupled can be represented by a coupling coefficient ($K_r$). The distance between waveguides can be controlled so to bring the resonator structure 320 as close as waveguides 302. The coupling length represents an effective curve length of the resonator structure 320 for the coupling phenomenon to happen with the waveguide, which can be based on a radius of curvature of the resonator structure 320 where the evanescent coupling is to occur. In the case of FIG. 3, the radius of the resonator structure 320 may be designed to achieve a desired curve length for a desired resonance frequency. The resonance frequency is also dependent on effective refractive indices between the waveguide and the resonator structure 320.

Optical filter device 300 also comprises a delay line 330 formed of waveguides 304 along the second arm 313. Delay line 330 may be provided as a difference in length between second arm 313 and first arm 311, for example, by increasing the length of second arm 313 relative to first arm 311 by $\Delta L_{MZI}$. In this example, the delay line 330 has a length of half the round-trip length of the resonator structure ($L_{ring}/2$).

According to the example of FIG. 3, resonator structure 320 and delay line 330 comprise phase shift mechanism 305a and phase shift mechanism 305b formed along the respective waveguide. One or more phase shift mechanisms 305 can be implemented as the optical modulation device 100 and/or the optical modulation device 200. Thus, a voltage bias can be selectively applied to the one or more phase shift mechanism 305 to induce a non-volatile phase shift on an optical signal propagating in the respective waveguides (e.g., waveguides 302 and/or waveguides 304). For example, a setting voltage bias can be applied to the phase shift mechanisms 305a to form a conductive path within phase shift mechanisms 305a, which causes the effective index of refraction of the waveguide to change, as described above. The change in effective refractive index of the waveguide forming the resonator structure 320 can be used to tune the resonance frequency and change the phase of an optical signal resonating therein. The tuning may be reset by a resetting voltage bias, as described above. Similarly, a setting voltage bias can be applied to phase shift mechanisms 305b to induce a phase shift of an optical signal in delay line 330.

This non-volatile phase tuning through one or more phase shift mechanism 305 can provide for passband tuning of the optical filter device 300. For example, MZI 310 receives an input optical signal at the input port 312a, which is split into first arm 311 and second arm 313 according to a coupling coefficient of coupler 316 ($c_0$). The optical signal on first arm 311 is optically coupled into resonator structure 320 based on a coupling coefficient ($K_r$). In the resonator structure 320, phase shift mechanisms 305a can be controlled to tune the resonance frequency via a setting voltage bias, thereby inducing a non-volatile phase-shift applied to the optical signal resonating in the resonator structure 320. The optical signals propagating in the arms 311 and 313 can be combined by a coupler 318, which may be substantively similar to coupler 316, resulting in constructive and/or destructive interference between optical signals from each arm. The resulting optical signal is then output to, for example, first output port 314a and second output port 314b. In delay line 330, phase shift mechanism 305b can be controlled to induce another non-volatile phase-shift applied to an optical signal along waveguides 304, which can be tuned to provide for the constructive and/or destructive interference.

By tuning one or more of phase shift mechanisms 305a and phase shift mechanisms 305b, the wavelengths of light on the optical signal at an output port of the MZI 310 can be changed. The change in wavelength represents a tuning of the passbands of the optical filter device 300. Equation 3 below provides an example transmission passband spectrum ($\Phi_{1-ringRAMZI}$) for a single micro-ring resonator assisted MZI, such as the example shown in FIG. 3.

$$\Phi_{1-ringRAMZI} = \begin{bmatrix} c_1(\lambda) & -js_1(\lambda) \\ -js_1(\lambda) & c_1(\lambda) \end{bmatrix} \begin{bmatrix} A^R(z)/A(z) & 0 \\ 0 & e^{j2\pi n_g(\lambda)L_{ring}/\lambda} \end{bmatrix} \quad \text{Eq. 3}$$

-continued $$\begin{bmatrix} c_0(\lambda) & -js_0(\lambda) \\ -js_0(\lambda) & c_0(\lambda) \end{bmatrix}$$

where $c_0$ is the cross coupling coefficient of coupler 316 as a function of wavelength ($\lambda$), which represents the amount light on waveguide that is coupled to another waveguide by the coupler 316 (e.g., coupling of an optical input on waveguide 302 that is coupled into waveguide 304 by coupler 316); $c_1$ is the cross coupling coefficient of coupler 318 as a function of $\lambda$; $K_r$ is the coupling coefficient between the resonator structure 320 and waveguides 302 as a function of $\lambda$; j represents an imaginary number; $S_0$ represents a throughput coefficient of coupler 316 as a function of $\lambda$, which represents an amount of light input into one waveguide that passes through the coupler 316 to the same waveguide (e.g., a throughput of optical input into waveguide 302 that passes through coupler 316 and continues along waveguides 302); si represents throughput coefficient of coupler 318 as a function of $\lambda$; $L_{ring}$ is the round-trip length of the resonator structure 320; and $n_g$ is the group velocity refractive index. A and $A^R$ are variables provided as:

$$A^R(z) = \sqrt{1 - \kappa_r} + \left(e^{j2\pi n_g(\lambda)L_{ring}/\lambda}\right)^{-2} \qquad \text{Eq. 4}$$

$$A(z) = 1 + \sqrt{1 - \kappa_r} \left(e^{j2\pi n_g(\lambda)L_{ring}/\lambda}\right)^{-2} \qquad \text{Eq. 5}$$

Figure 4A:
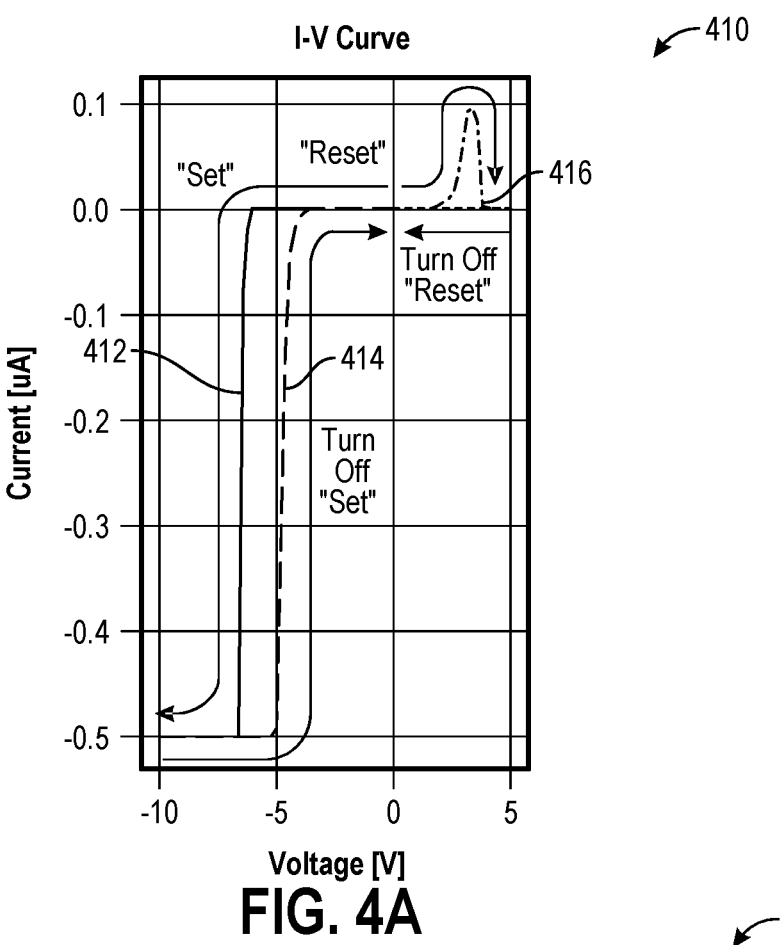
FIG. 4A depicts an example current-voltage hysteresis curve showing non-volatile memristive behavior of an example implementation of optical filter device of FIG. 3.
Figure 4B:
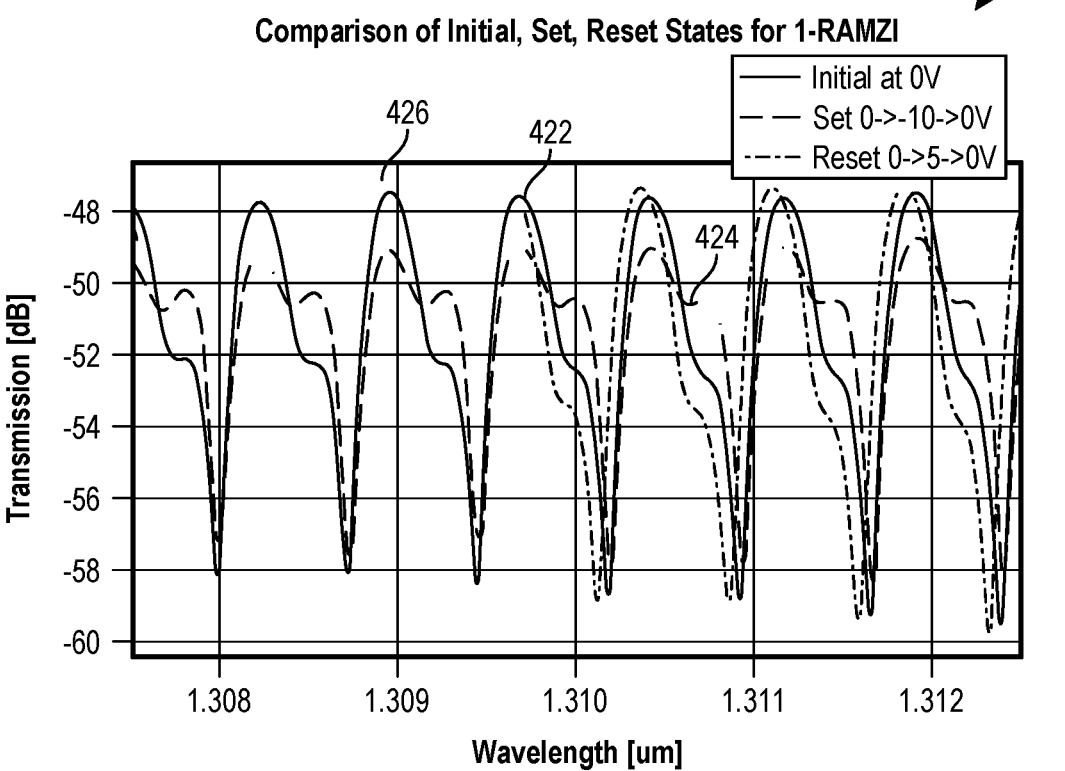
FIG. 4B depicts transmission passband spectrums for the non-volatile memristive behavior shown in FIG. 4A.

Optical filter device 300 may be formed in a silicon-based photonic chip on a silicon-on-insulator (SOI) platform. In this case, waveguides 302 and 304 may be formed from silicon or other Group IV material on a substrate (e.g., silicon substrate). As described above, the phase shift mechanisms 305a and phase shift mechanisms 305b may be hydrophilic wafer-bonded to the waveguide FIG. 4A depicts an example current-voltage (I-V) hysteresis curve 410 showing non-volatile memristive behavior of an example implementation of optical filter device 300. FIG. 4B depicts transmission passband spectrums 420 for the non-volatile memristive behavior shown in FIG. 4A.

FIGS. 4A and 4B are experimental results of setting and resetting of non-volatile behavior of an example optical filter device 300. For example, the phase shift mechanism are implemented as Group III-V/Si MOSCAP structures (e.g., as described in connection with FIGS. 2A-2C above) defined by silicon waveguides (p-doped with a concentration of $5 \times 10^{17}$ cm$^{-3}$) having a width, a height, and an etch depth of 500 nm, 300 nm, and 170 nm, respectively. The Group III-V layer was wafer-bonded to the waveguide and consists of a 190 nm-thick GaAs that is n-doped with a concentration of $3 \times 10^{18}$ cm$^{-3}$. Prior to wafer-bonding, the Group III-V layer was coated 0.8 nm of $Al_2O_3$ followed by a 3.9 nm coating of $HfO_2$ and the Si waveguide was coated with 1.7 nm of $HfO_2$ and 3.8 nm of $Al_2O_3$, all via ALD. As a result, the stack consists of n-GaAs, $Al_2O_3$, $HfO_2$, $Al_2O_3$, $HfO_2$, $Al_2O_3$, p-Si in that order, which corresponds to cathode 204, layer 218c, layer 218a, bonding interface 219, layer 218b, layer 218d, and anode 206, respectively. The bonding interface 219, in this example, has a thickness of 2.0 nm. Assuming $HfO_2$ has a refractive index of nHf02=1.88, optical confinement factors are $\Gamma_{HfO2}$=1.159% and $\Gamma_{III-V}$=28.33% with an overall effective index of $n_{eff}$=3.1144. In this example, the ring resonator length of $L_{ring}$ was 1200 μm for a calculated group index of $n_g$ of 3.78 and the coupling coefficients are $c_0$=$c_1$=0.50 and $K_r$=0.89.

In the example of FIG. 4A, a setting voltage bias is applied across a phase shift mechanism (e.g., phase shift mechanisms 305a and/or phase shift mechanisms 305b) shown as curve 412. For example, a voltage bias is increasingly applied until a jump in the absolute value of the current is experienced across the phase shift mechanism. The point where this jump is detected represents the setting voltage bias, which creates a conductive path in the phase shift mechanism to permit a flow of current through the device. This may be referred to as a set state of the phase shift mechanism. In this example, a voltage bias of −10V is applied, at which point a jump in current (e.g., −0.5 μA) occurs, shown as curve 412. Curve 414 depicts removing the voltage bias from the phase shift mechanism such that the voltage bias is returned to 0V. Thus, curve 412 represents voltage bias of 0V to −10V and curve 414 represents a voltage bias of −10V to 0V.

FIG. 4B shows transmission passband spectrums 420 detected at an output port of the optical filter device 300. In this example, FIG. 4B shows transmission passbands detected from first output port 314a of optical filter device 300. Curve 422 represents a transmission passband spectrum (also referred to as an optical response), according to Eq. 3, prior to applying the setting voltage bias shown as curve 412 of FIG. 4A. Thus, curve 422 can be considered an initial state with no voltage bias applied. Curve 424 represents a transmission passband spectrum once the setting voltage bias is applied and the conductive path is formed, thus corresponding to curves 412 and 414. As can be seen from FIG. 4B, the transmission passband spectrum changes from the initial state of curve 422 to the set state, having a spectrum shown by curve 424. The transmission passband spectrum of curve 424 remains, even when the voltage bias is removed (e.g., at 0V), thus illustrating the non-volatile memristive behavior achieved by the implementations disclosed herein.

At a point later, a resetting voltage bias can be applied having an opposite polarity of the setting voltage, shown as curve 416. For example, a voltage bias is applied in an opposite direction relative to the setting voltage (e.g., opposite polarity) until a jump in current is detected. This jump in current generates heat that ruptures the conductive path, thereby placing the phase shift mechanism into a reset state. In this example, the resetting voltage bias of 5V results in a jump of current to 0.1 μA, which ruptures the conductive path, and resets the phase shift mechanism to the reset state.

FIG. 4B shows transmission passband spectrum for the reset state as curve 426. As can be seen from FIG. 4B, the reset state (curve 426) is substantively similar to the initial state (curve 422), in that both curves comprise approximately identical transmission spectrums. Whereas, the set state (curve 424) has a different spectrum that is changed due to the memristive behavior of the phase shift mechanism.

Figure 5:
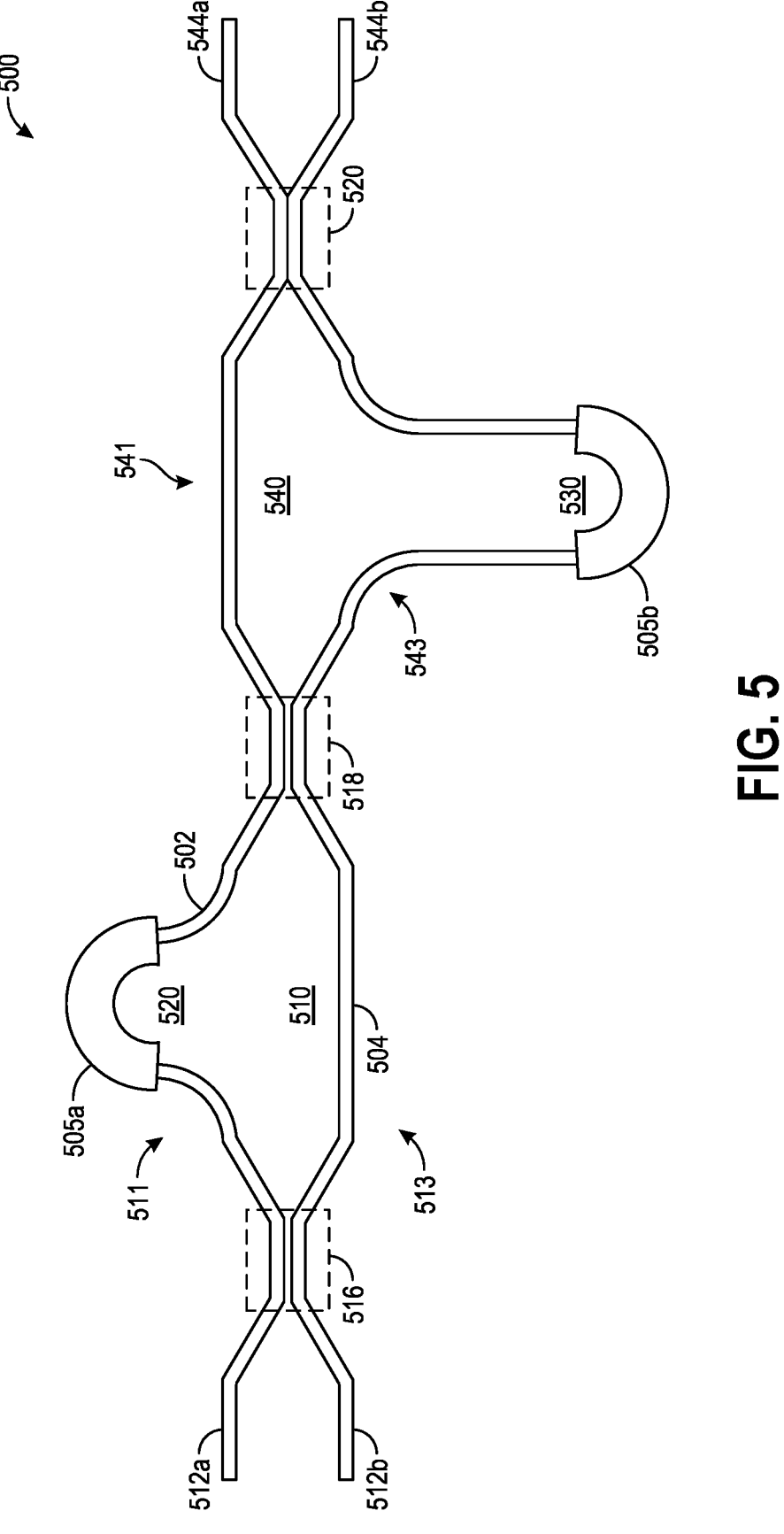
FIG. 5 depicts a schematic diagram of another optical filter device in accordance with an implementation disclosed herein.

FIG. 5 depicts a schematic diagram of another optical filter device 500 in accordance with implementations disclosed herein. The optical filter device 500 according to various examples may be implemented, for example, as a (de-) interleaver. The optical filter device 500 comprises one or more phase shift mechanism 505 (shown as phase shift mechanisms 505a and 505b), implemented as the optical modulation device 100 of FIG. 1 and/or the optical modulation device 200 of FIGS. 2A-2C, disposed on one or more waveguides, such as a waveguide 502 and/or waveguide 504. The waveguides may be formed from silicon or other Group IV material, such that optical filter device 500 may be implemented in a SOI platform.

Optical filter device 500, according to this example, is provided as a $3^{rd}$ order asymmetric MZI (AMZI), which can be provided a first MZI 510 coupled to a second MZI 540. Optical filter device 500 can be utilized to filter an optical signal input into the optical filter device 500 according to wavelengths contained in the optical signal based on constructive and destructive interference between optical signals on each waveguide 502 and/or 504.

MZI 510 comprises waveguides 502 and 504 that guide propagation of an optical signal input into an input port 512a and 512b, respectively. An optical signal input into one of the waveguides can be optically coupled into the other waveguide by a coupler 516, which is substantively similar to coupler 316 of FIG. 3.

MZI 510 comprises a first arm 511 formed of waveguide 502 and a second arm 513 formed of waveguide 504. A delay line 520 can be provided on one of the arms of MZI 510, for example, on first arm 511. The delay line 520 may comprise a phase shift mechanism 505a formed thereon. Optical signals propagating on the first and second arms 511 and 513 are combined via coupler 518, which may be substantively similar to coupler 516, resulting in constructive and/or destructive interference. In MZI 510, phase shift mechanism 505a can be controlled to induce a non-volatile phase-shift applied to an optical signal along first arm 511, which can be tuned to provide for the constructive and/or destructive interference. This interference can be used to change the transmission passband spectrum output from MZI 510.

The outputs from MZI 510 are provided to second MZI 540 via coupler 518. Second MZI 540 comprises a first arm 541, formed of waveguide 502, and a second arm 543, formed of waveguide 504. A delay line 530 can be provided on one of the arms of second MZI 540, for example, on second arm 543. The delay line 530 may comprise a phase shift mechanism 505b formed thereon. Optical signals propagating on the first and second arms 541 and 543 are combined via coupler 520, which may be substantively similar to coupler 516, resulting in constructive and/or destructive interference. In second MZI 540, phase shift mechanism 505b can be controlled to induce a non-volatile phase-shift applied to an optical signal along second arm 543, which can be tuned to provide for the constructive and/or destructive interference. This interference can be used to change the transmission passband spectrum output from MZI 540, which can be detected at one or more of the output ports 544a and/or 544b.

Figure 6A:
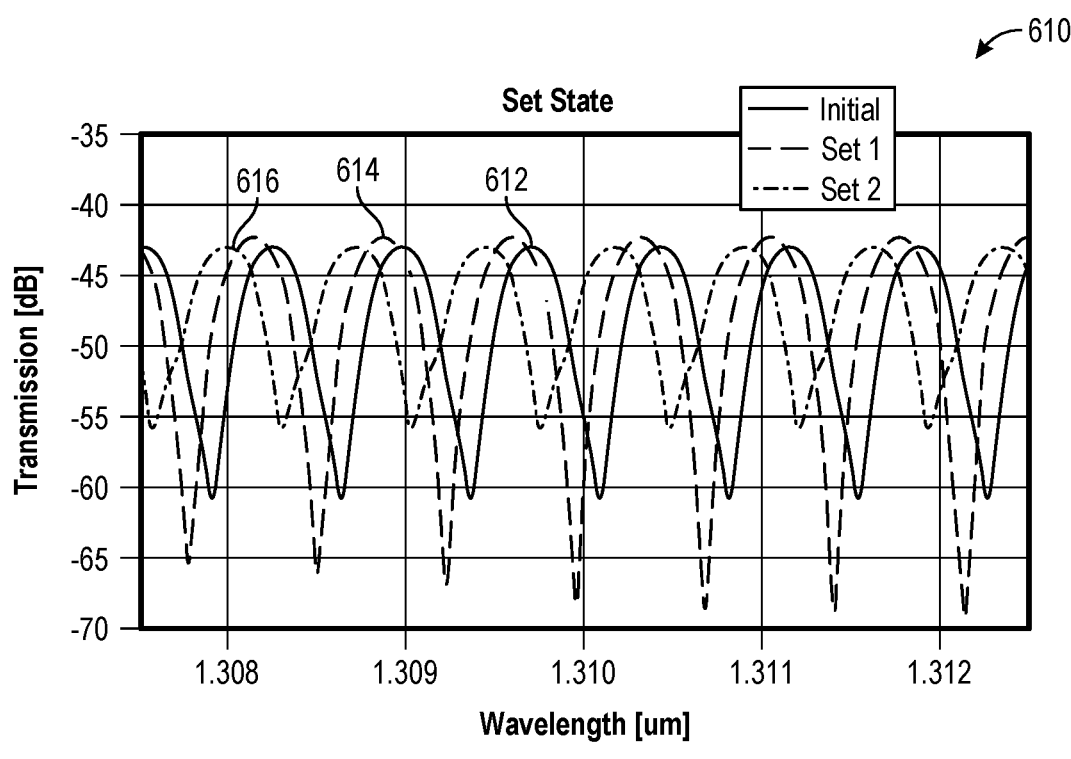
FIG. 6A depicts transmission passband spectrums of non-volatile memristive behavior exhibited by the optical filtering device of FIG. 5.

Optical filter device 500 can be used to set multiple non-volatile states, for example, by setting the MZI 510 to one state and second MZI 540 to another. FIG. 6A depicts transmission passband spectrums 610 of non-volatile memristive behavior according to the optical filter device 500 of FIG. 5. The transmission passband spectrums 610 includes an initial state curve 612, a first set state curve 614, and a second set state curve 616 detected at an output port 544a of FIG. 5. The first set state curve 614 represents a transmission passband spectrum after applying a setting voltage bias to phase shift mechanism 505a of FIG. 5, which sets a non-volatile phase shift in the phase shift mechanism 505a. The second set state curve 616 represents a transmission passband spectrum after applying a setting voltage bias to phase shift mechanism 505b of FIG. 5, which sets a non-volatile phase shift in the phase shift mechanism 505b. Prior to the setting voltage biases, the transmission passband spectrum is shown as initial state curve 612.

Figure 6B:
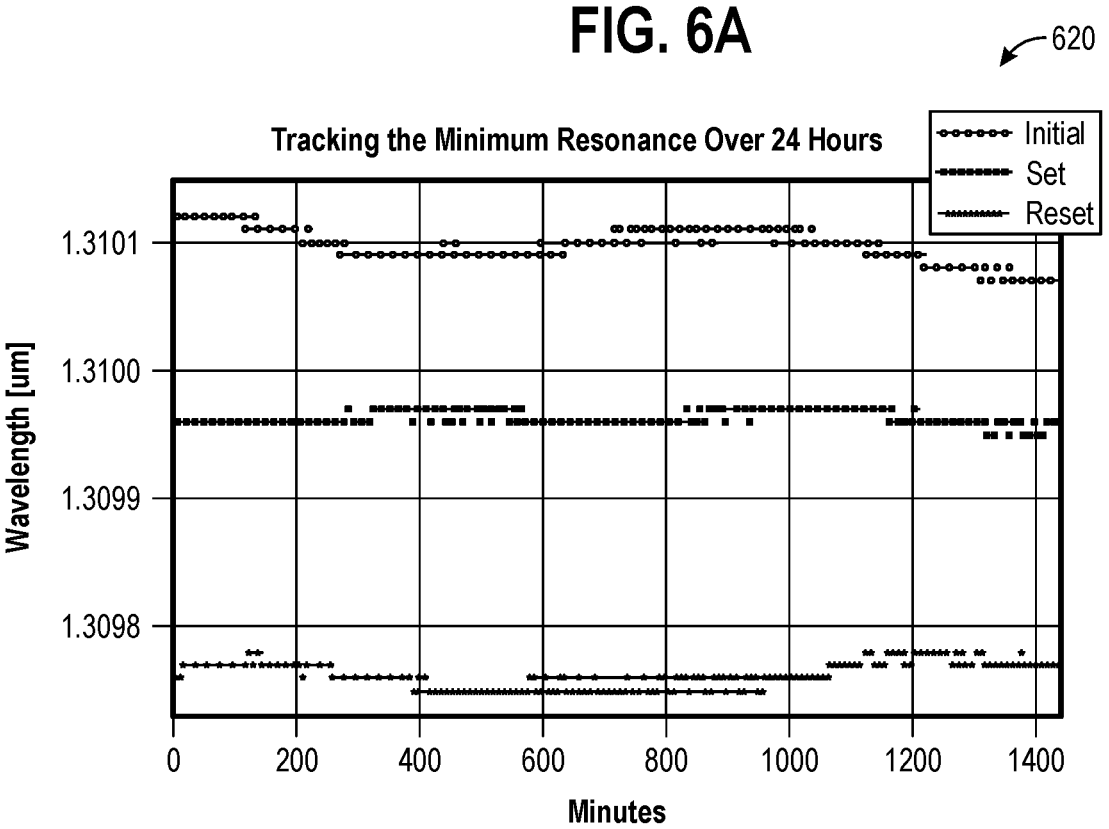
FIG. 6B depicts tracking of the transmission passband spectrums of FIG. 6A.

FIG. 6B depicts tracking of transmission passband spectrums of FIG. 6A over a length of time. For example, FIG. 6B depicts a minima wavelength detected as a function of time over a 24 hour period for each of the initial state, set state, and reset state. As can be seen from FIG. 6B, the non-volatile behavior can be reliably retained over a length of time, with a worst case deviation of +/−0.02 nm within the initial state tracking. This reliability and retention over time can be particularly useful for applying weights by setting non-volatile behavior within the devices for use in ONN applications, which rely on predictability and consistency in applying weights to inputs to provide expected results.

While FIG. 6B depicts reliable retention of the non-volatile behavior for optical filter device 500, similar results can be achieved using optical modulation device 200 and/or optical modulation device 100 as described above. Thus, FIG. 6B can be illustrative of similar retention of non-volatile behavior of optical modulation device 200 and/or optical modulation device 100.

FIG. 7 illustrates an example computing component that may be used to implement optical filtering in accordance with various embodiments. Referring now to FIG. 7, computing component 700 may be, for example, a server computer, a controller, or any other similar computing component capable of processing data. In the example implementation of FIG. 7, the computing component 700 includes a hardware processor 702, and machine-readable storage medium 704.

Hardware processor 702 may be one or more central processing units (CPUs), semiconductor-based microprocessors, and/or other hardware devices suitable for retrieval and execution of instructions stored in machine-readable storage medium 704. Hardware processor 702 may fetch, decode, and execute instructions, such as instructions 706-710, to control processes or operations for optical filtering. As an alternative or in addition to retrieving and executing instructions, hardware processor 702 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 704, may be any electronic, magnetic, optical, or other physical storage device that contains or stores executable instructions. Thus, machine-readable storage medium 704 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 704 may be a non-transitory storage medium, where the term "non-transitory" does not encompass transitory propagating signals. As described in detail below, machine-readable storage medium 704 may be encoded with executable instructions, for example, instructions 706-710.

Hardware processor 702 may execute instruction 706 to apply a setting bias across an oxide layer of a MOSCAP and form a filamentation layer in a the MOSCAP between a waveguide and a semiconductor material. For example, the MOSCAP may be provided as described in connection with FIGS. 2A-2C. As described above, a filamentation layer can be formed in a dielectric between the waveguide and a semiconductor material. The conductive path can remain in the oxide layer when the setting bias is removed and/or in the absence of a power supply applied thereto.

Hardware processor 702 may execute instruction 708 to produce charge trap regions in the oxide layer based on forming the filamentation layer. As described above in connection with FIGS. 2A-2C, charge trap regions can be formed in the oxide layer, for example, based on forming the filamentation layer.

Hardware processor 702 may execute instruction 710 to create a conductive path in the oxide layer by trapping charge within the charge trap regions such that the MOSCAP operates as a resistor, wherein the conductive path causes a change in an optical response of the waveguide. For example, as described in connection with FIGS. 2A-2C, the charge trap regions operate to hold charges within the regions, which provide a pathway for electrons to flow. The conductive pathways cause a change in a refractive index of the waveguide, which can result in a change in the optical response in the waveguide.

In some examples, as described in connection with FIGS. 3 and 5, the change in refractive index can be leveraged for optical filtering techniques. For example, an optical filter can be provided that comprises the waveguide coupled to the MOSCAP as a phase shift mechanism. Applying the setting voltage can be used to tune a non-volatile phase shift of the phase shift mechanism, which can be used to provide constructive and/or destructive interference. In the case of an MZI, this constructive and/or destructive interference can be used to filter an optical signal.

Figure 8:
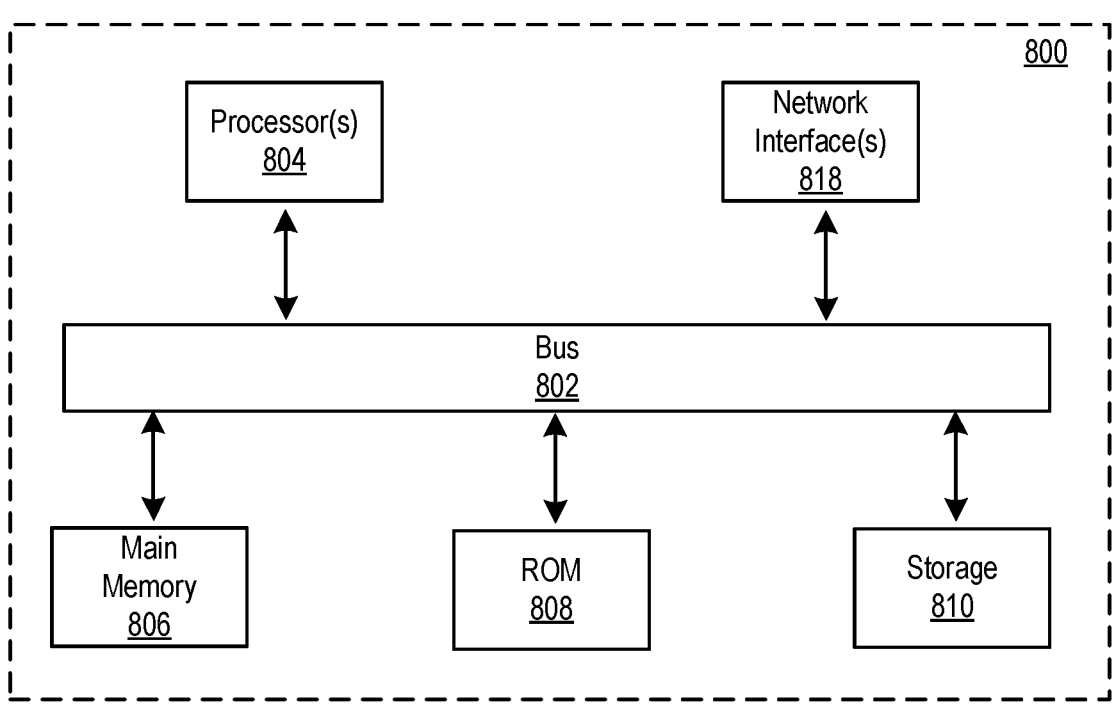
FIG. 8 is an example computer system that may be used to implement various features of optical filtering of the present disclosure.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors. The computer system 800 may be implemented as a control circuit 106 of FIG. 1 and/or for controlling power source 226 of FIG. 2B.

The computer system 800 also includes a main memory 806, such as a random access memory (RAM), cache and/or other dynamic storage devices, coupled to bus 802 for storing information and instructions to be executed by processor 804. Main memory 806 may also be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but may be used in conjunction with, transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Communication interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network, now commonly referred to as the "Internet." Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period, or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, the method comprising:
   forming a filamentation layer in a metal-oxide-semiconductor capacitor (MOSCAP) between a waveguide and a semiconductor material of the MOSCAP by applying a setting bias across an oxide layer of the MOSCAP;
   producing charge trap regions in the oxide layer based on forming the filamentation layer; and
   creating a conductive path in the oxide layer by trapping charge within the charge trap regions such that the MOSCAP operates as a resistor, wherein the conductive path causes a change in an optical response of the waveguide.

2. The method of claim 1, wherein the conductive path remains in the oxide layer when the setting bias is removed from the oxide layer.

3. The method of claim 1, further comprising:
   tuning a phase shift mechanism of an optical filter based on creating the conductive path.

4. The method of claim 3, wherein the phase shift mechanism comprises the MOSCAP coupled to the waveguide.

5. The method of claim 3, wherein the phase shift mechanism is coupled to a resonator structure of an optical filter, wherein tuning the phase shift mechanism changes a resonance frequency of the resonator structure.

6. The method of claim 5, wherein the resonator structure comprises a micro-ring, and wherein the optical filter comprises a micro-ring assisted Mach-Zehnder Interferometer.

7. The method of claim 1, further comprising:
   applying a reset bias across the oxide layer, the reset bias having a polarity that is opposite of a polarity of the setting bias, wherein applying the reset bias ruptures the conductive path by dissipating the charge trap regions based on dissipation of the filamentation layer.

8. The method of claim 1, wherein the filamentation layer is formed in a dielectric disposed between the waveguide and the semiconductor material of the MOSCAP.

9. An optical filter, comprising:

a first waveguide formed on a substrate; and a phase shift mechanism coupled to the first waveguide, the phase shift mechanism comprising:

a semiconductor material layer bonded to a length of the first waveguide; and a filamentation layer formed between the first waveguide and the semiconductor material, wherein the filamentation layer causes a non-volatile change in a refractive index of the first waveguide.

10. The optical filter of claim 9, further comprising:

an oxide layer disposed between the first waveguide and the substrate, the oxide layer comprising charge trap regions based on the filamentation layer, wherein a conductive path is provided by the charge trap regions that causes the non-volatile change in a refractive index of the waveguide.

11. The optical filter of claim 9, wherein the filamentation layer is formed based on application of a voltage bias to the phase shift mechanism and remains in the phase shift mechanism in the absence of the voltage bias.

12. The optical filter of claim 9, wherein the semiconductor material layer comprises a Group III-V material.

13. The optical filter of claim 9, wherein the phase shift mechanism comprises a metal-oxide-semiconductor capacitor (MOSCAP).

14. The optical filter of claim 9, further comprising:

a Mach-Zehnder Interferometer (MZI) comprising a first arm and a second arm, the first arm comprises the first waveguide and the second arm comprises a second waveguide, wherein the MZI is configured to filter an optical signal input into the MZI based on the non-volatile change in a refractive index of the first waveguide.

15. The optical filter of claim 14, wherein the first arm is formed of a third waveguide, the optical filter further comprising:

a resonator structure formed of the first waveguide and optically coupled to the third waveguide, wherein the non-volatile change in a refractive index of the first waveguide causes change in resonance frequency of the resonator structure.

16. The optical filter of claim 14, wherein the first arm is formed of the first waveguide and comprises a delay line, wherein the phase shift mechanism is coupled to the delay line.

17. A non-transitory computer-readable storage medium storing instructions that, when executed by a processor, cause the processor to perform a method comprising, comprising:

tuning a phase shift of a first waveguide from an initial phase to a non-volatile phase shift by applying a first voltage bias to a metal-oxide-semiconductor capacitor (MOSCAP) coupled to the first waveguide;

filtering an input optical signal based on the non-volatile phase shift; and tuning the phase shift of the first waveguide to the initial phase shift by applying a second voltage bias to the MOSCAP, the second voltage bias having a polarity that is opposite of the first voltage bias.

18. The non-transitory computer-readable storage medium of claim 17, wherein the MOSCAP comprises a semiconductor material formed on the first waveguide, wherein applying the first voltage bias forms a filamentation layer between the first waveguide and the semiconductor material, wherein the non-volatile phase shift is based on the forming of the filamentation layer.

19. The non-transitory computer-readable storage medium of claim 18, wherein the filamentation layer is formed in a dielectric between the waveguide and the semiconductor material of the MOSCAP.

20. The non-transitory computer-readable storage medium of claim 17, further comprising:

supplying the input optical signal into a Mach-Zehnder Interferometer (MZI), the MZI comprises a first arm including the first waveguide, a second arm including a second waveguide, and a coupler that couples optical signals propagating in the first and second waveguides;

wherein filtering the optical signal is based on one or more of constructive interface and destructive interference, at the coupler, between optical signals propagating in the first and second waveguides based on the non-volatile phase shift.

* * * * *